(12) United States Patent
Sato

(10) Patent No.: US 7,292,838 B2
(45) Date of Patent: Nov. 6, 2007

(54) TERMINAL AND STANDBY OPERATION CONTROL METHOD

(75) Inventor: Hiroto Sato, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 351 days.

(21) Appl. No.: 10/946,533

(22) Filed: Sep. 20, 2004

(65) Prior Publication Data

US 2006/0025105 A1 Feb. 2, 2006

(51) Int. Cl.
*H04B 1/16* (2006.01)

(52) U.S. Cl. .............................. 455/343.1; 455/343.2; 455/574; 455/127.1

(58) Field of Classification Search ............. 455/343.1, 455/343.2, 127.1, 572, 573, 574, 343.3
See application file for complete search history.

(56) References Cited

U.S. PATENT DOCUMENTS

| | | | | |
|---|---|---|---|---|
| 4,673,861 A | * | 6/1987 | Dubovsky et al. | ........ 455/343.1 |
| 5,148,470 A | * | 9/1992 | Kobayashi et al. | ......... 455/573 |
| 5,200,688 A | * | 4/1993 | Patino et al. | ............... 455/573 |
| 5,867,797 A | * | 2/1999 | Hashimoto | .................. 455/572 |
| 6,035,191 A | | 3/2000 | Moore | |
| 6,049,719 A | * | 4/2000 | Schroter | ...................... 455/417 |
| 6,188,888 B1 | * | 2/2001 | Bartle et al. | ................. 455/573 |
| 6,201,975 B1 | * | 3/2001 | Isberg et al. | ................. 455/557 |
| 6,226,536 B1 | * | 5/2001 | Miyashita | .................... 455/574 |
| 6,411,829 B1 | * | 6/2002 | Takenaka | .................... 455/573 |
| 6,445,936 B1 | * | 9/2002 | Cannon et al. | ............. 455/573 |
| 6,501,969 B1 | * | 12/2002 | Cannon et al. | .......... 455/343.1 |
| 6,529,744 B1 | * | 3/2003 | Birkler et al. | ............... 455/557 |
| 6,625,478 B1 | * | 9/2003 | Nonogaki | .................... 455/574 |
| 6,628,966 B1 | | 9/2003 | Nagata | |
| 6,954,660 B2 | * | 10/2005 | Aoyama | ....................... 455/572 |
| 7,007,177 B2 | * | 2/2006 | Cannon et al. | ............. 455/574 |
| 2002/0082059 A1 | * | 6/2002 | Nariai et al. | ................. 455/573 |
| 2002/0107009 A1 | | 8/2002 | Kraft et al. | |
| 2002/0132610 A1 | | 9/2002 | Chaplin et al. | |
| 2005/0118988 A1 | * | 6/2005 | Benco et al. | ............. 455/422.1 |

FOREIGN PATENT DOCUMENTS

| | | |
|---|---|---|
| EP | 0 865 188 A2 | 9/1998 |
| GB | 2 372 911 A | 9/2002 |
| JP | 6-237542 A | 8/1994 |
| JP | 7-283777 | 10/1995 |
| JP | 07-283777 | * 10/1995 |
| JP | 2002-291034 A | 10/2002 |

* cited by examiner

*Primary Examiner*—Lana Le
(74) *Attorney, Agent, or Firm*—Frishauf, Holtz, Goodman & Chick, P.C.

(57) ABSTRACT

There is provided a terminal which has wireless communication unit to perform wireless communication and which operates using power supplied from an external power supply or power of a battery. The terminal includes a detection unit configured to detect whether power is supplied from the external power supply, and a control unit configured to cause the terminal to start standby operation of waiting for a signal though the wireless communication unit when the detection unit detects that power is supplied from the external power supply.

6 Claims, 5 Drawing Sheets

Example of M2

Example of M3

Example of M5

Example of M6

TERMINAL AND STANDBY OPERATION CONTROL METHOD

CROSS-REFERENCE TO RELATED APPLICATIONS

This application is based upon and claims the benefit of priority from prior Japanese Patent Application No. 2004-223677, filed Jul. 30, 2004, the entire contents of which are incorporated herein by reference.

BACKGROUND OF THE INVENTION

1. Field of the Invention

The present invention relates to a terminal which has a wireless communication function, can operate using power supplied from an external power supply, and can operate using power of a battery when no power is supplied from the external power supply, and a standby operation control method which is applied to the terminal.

2. Description of the Related Art

Terminals (a PDA, portable computer, and the like) each having a wireless communication function such as Bluetooth® or wireless LAN (Local Area Network) have recently come into widespread use.

A terminal having a wireless communication function can be used all the time in a standby state wherein it waits for signals through the wireless communication function. In the standby state, however, the battery power is rapidly consumed. For this reason, in a terminal of this type, the user manually starts/stops standby operation.

In many cases, a charger is equipped with such a terminal whose battery power is rapidly consumed. For example, Jpn. Pat. Appln. KOKAI Publication No. 2002-291034 discloses that a portable communication terminal is charged by a charging circuit on the charger side when the portable communication terminal is connected to the charger. This reference also discloses that each of the portable communication terminal and charger is provided with a wireless communication interface unit. When the portable communication terminal is out of reach of weak radio waves from the charger, or it is determined that the portable communication terminal is out of reach, voltage supply to the wireless communication interface units is cut off to deactivate the wireless communication interface units, thereby reducing the current consumption.

However, a conventional terminal is arranged to start/stop the standby operation by manual operation of the user and is inconvenient. The technique of the above-mentioned reference needs a wireless communication interface unit also on the charger side and thus results in high cost. Also, the technique cannot satisfactorily meet user demands.

For example, when the terminal is connected to the charger, power is supplied all the time from the charger to the terminal. The user often wants to start the standby operation without concern for consumption of the battery. In this case, the user must make settings to start the standby operation every time he/she connects the terminal to the charger. The user may forget to make these settings.

Similarly, when the terminal is not connected to the charger, the user may want to stop the standby operation in order to suppress consumption of the battery. In this case, the user must make settings to stop the standby operation every time he/she removes the terminal from the charger. The user may forget to make these settings.

Under the circumstances, it is desired to provide a terminal and a standby operation control method, in which the convenience in standby operation of a terminal can be increased.

BRIEF SUMMARY OF THE INVENTION

According to one aspect of the present invention, there is provided a terminal which has wireless communication unit to perform wireless communication and which operates using power supplied from an external power supply or power of a battery, the terminal comprising a detection unit configured to detect whether power is supplied from the external power supply; and a control unit configured to cause the terminal to start standby operation of waiting for a signal though the wireless communication unit when the detection unit detects that power is supplied from the external power supply.

According to another aspect of the present invention, there is provided a standby operation control method applied to a terminal which has wireless communication unit and which operates using power supplied from an external power supply or power of a battery, the method comprising detecting whether power is supplied from the external power supply; and causing the terminal to start standby operation of waiting for a signal through the wireless communication unit when it is detected that power is supplied from the external power supply.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described below with reference to the drawings.

Figure 1:
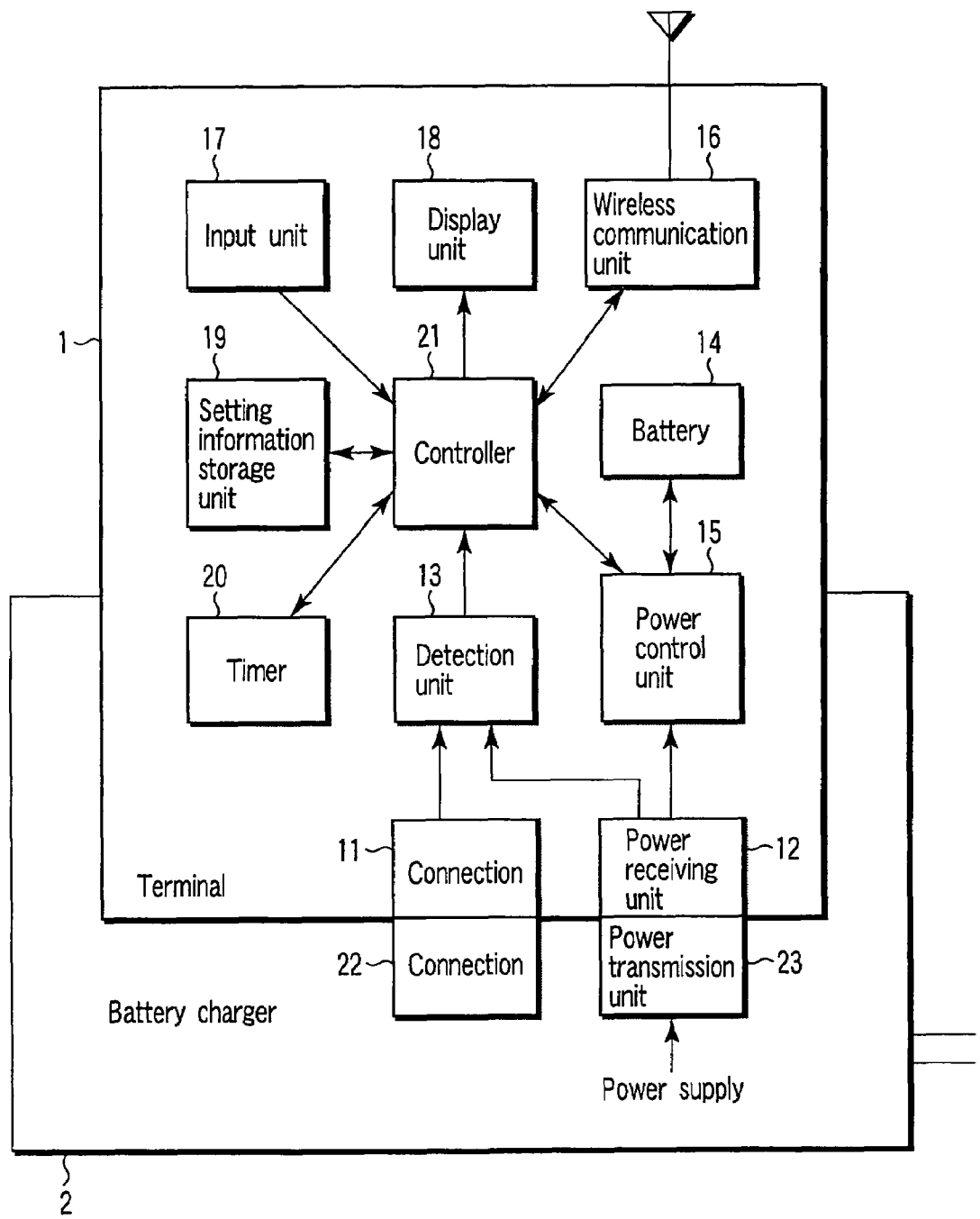
FIG. 1 is a block diagram showing the arrangement of a terminal and battery charger according to one embodiment of the present invention.

FIG. 1 is a block diagram showing the arrangement of a terminal and battery charger according to one embodiment of the present invention.

A terminal 1 corresponds to a PDA (personal digital assistant), portable computer, or the like and has a wireless communication function such as Bluetooth®, wireless LAN (Local Area Network), or the like. In the following description, the terminal 1 is assumed to have a wireless communication function that meets Bluetooth standard. The terminal 1 is arranged to be detachable from a battery charger 2. The terminal 1 can be powered from the battery charger 2 when it is mounted on the battery charger 2. On the other hand, the terminal 1 can operate using power of a battery when no power is supplied from the battery charger 2.

The battery charger 2 corresponds to a car-mounted hands-free battery charger, AC adaptor, or cradle. The battery charger 2 can stably power the terminal 1 mounted on or connected to the battery charger 2 all the time.

The terminal 1 includes a connection 11, power receiving unit 12, detection unit 13, battery 14, power control unit 15, wireless communication unit 16, input unit 17, display unit 18, setting information storage unit 19, timer 20, controller 21, and the like.

The connection 11 mechanically connects to a connection 22 on the battery charger 2 side when the terminal 1 is mounted on the battery charger 2. The detection unit 13 is informed of connection/disconnection between the connection 11 and the connection 22.

The power receiving unit 12 receives power from the battery charger 2 through a power transmission unit 23 when the terminal 1 is mounted on the battery charger 2, and transmits the received power to the power control unit 15. The detection unit 13 is informed of whether the terminal 1 is powered from the battery charger 2.

The detection unit 13 detects whether the connection 11 is connected to the connection 22 (i.e., whether the terminal 1 is mounted on the battery charger 2) and whether the power receiving unit 12 is powered from the power transmission unit 23 (i.e., whether the terminal 1 is powered from the battery charger 2). The controller 21 is informed of these detection results.

The battery 14 corresponds to a rechargeable battery. The battery 14 is recharged with power supplied from the battery charger 2 through the power receiving unit 12 and power control unit 15 when the terminal 1 is mounted on the battery charger 2. On the other hand, the battery 14 functions as the driving power supply of the terminal 1 when the terminal 1 is not mounted on the battery charger 2.

The power control unit 15 controls power supply to units of the terminal 1. The power control unit 15 supplies power to the units of the terminal 1 on the basis of power supplied from the battery charger 2 through the power receiving unit 12 and simultaneously recharges the battery 14, while the terminal 1 is mounted on the battery charger 2. On the other hand, the power control unit 15 supplies power to the units of the terminal 1 on the basis of power from the battery 14 when the terminal 1 is not mounted on the battery charger 2.

The wireless communication unit 16 has wireless communication function that meets Bluetooth standard. The wireless communication unit 16 performs short-distance wireless communication with other devices though antennas. The wireless communication unit 16 can perform services which include the Bluetooth profile. The wireless communication unit 16 can make settings for various operation modes such as a search enable mode, connection enable mode, and the like or specify a connectable device. In particular, the wireless communication unit 16 can start/stop the standby operation of waiting for radio signals from an external device that meets Bluetooth standard, under the control of the controller 21. During the standby operation, the wireless communication unit 16 sends back a predetermined response to a signal sent from the external device in compliance with the specifications of Bluetooth.

The user inputs information to the input unit 17 with a keyboard or pen. Information may be input by recognizing by voice recognition a sound uttered by the user. Input information is sent to the controller 21. The display unit 18 corresponds to an LCD or the like. The display unit 18 displays to the user various pieces of information on the screen. The information may be presented by a sound using a speaker, instead of presenting the information using the display unit 18.

The setting information storage unit 19 stores various pieces of setting information on, e.g., the operation mode of the wireless communication function. The timer 20 is used to measure a predetermined time period.

The controller 21 is a processor which controls the entire terminal 1. The controller 21 controls the units in accordance with a predetermined control program. The controller 21 has a plurality of operation modes as operations when the detection unit 13 detects that power is supplied from the external power supply. The user can select a desired one of the plurality of operation modes to place the terminal 1 in the selected operation mode.

For example, assume that the detection unit 13 detects that power is supplied from the external power supply and that the terminal 1 is in a predetermined setting state, for example, in a setting state where the wireless communication unit 16 is set to automatically start the standby operation if the terminal 1 is in a standby stop state. In this case, the controller 21 automatically starts the standby operation to wait for signals through the wireless communication unit 16. As an alternative, when the detection unit 13 detects that power is supplied from the external power supply, the controller 21 may present a plurality of processing items as choices to the user and execute the processing indicated by the selected processing item. Alternatively, if the user selects no processing item within a predetermined time period, the controller 21 may automatically select a predetermined processing item and execute the processing indicated by the item.

When the detection unit 13 detects that no power is supplied from the external power supply, and the terminal 1 is in a predetermined setting state, for example, in a setting state where the wireless communication unit 16 is set to automatically stop the standby operation if the terminal 1 is in a standby state, the controller 21 automatically stops the standby operation. As an alternative, when the detection unit 13 detects that no power is supplied from the external power supply, the controller 21 may present a plurality of processing items as choices to the user and execute the processing indicated by the selected processing item. If the user selects no processing item within the predetermined time period after the plurality of processing items are presented, the controller 21 may automatically select a predetermined processing item and execute the processing indicated by the processing item.

The connection 22 on the battery charger 2 side mechanically connects to the connection 11 on the terminal 1 side when the terminal 1 is mounted on the battery charger 2. The power transmission unit 23 supplies power to the terminal 1 through the power receiving unit 12 when the terminal 1 is mounted on the battery charger 2.

Various operation modes when the terminal 1 is mounted on the battery charger 2 and various operation modes when the terminal 1 is removed from the battery charger 2 will be described with reference to FIGS. 2 to 6.

First, the various operation modes when the terminal 1 is mounted on the battery charger 2 will be described.

Figure 2:
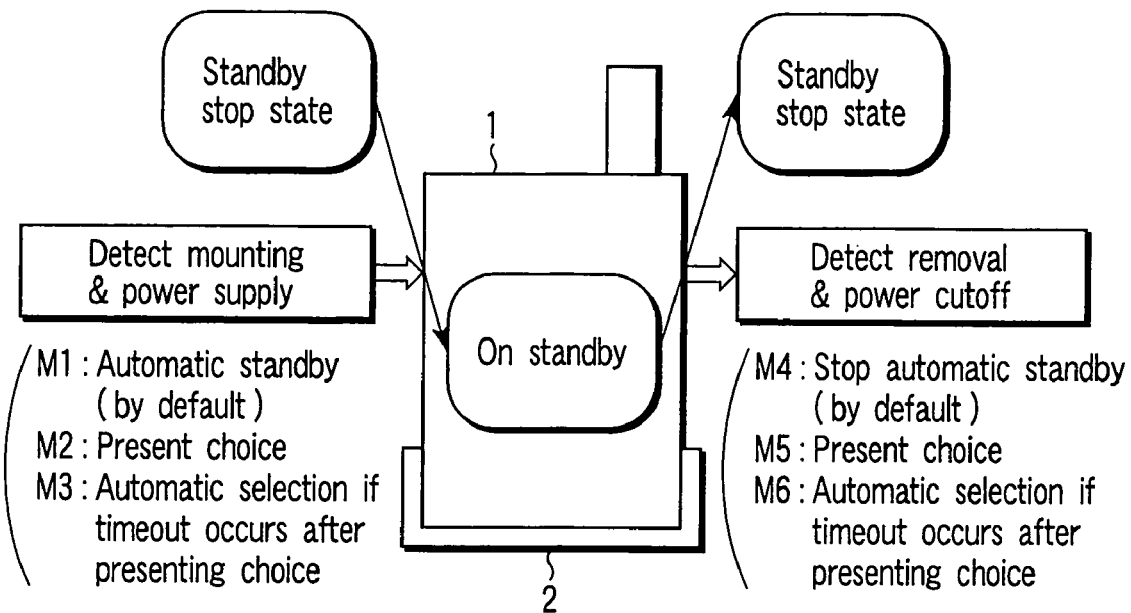
FIG. 2 is a schematic view for explaining various operation modes when the terminal is mounted on the battery charger and various operation modes when the terminal is removed from the battery charger.

As shown on the left side of FIG. 2, when the user mounts (sets) the terminal 1 of the standby stop state on the battery charger 2, and the detection unit 13 detects the connection state and power supply state, operation modes to which the terminal 1 shifts include the following three types of modes:

M1 (first operation mode): a mode of automatically starting the standby operation (note that the default is the automatic start of the standby operation).

M2 (second operation mode): a mode of presenting a plurality of processing items as choices to the user and executing the processing indicated by the selected processing item; and M3 (third operation mode): a mode of presenting the plurality of processing items as the choices to the user and automatically selecting a predetermined processing item and executing the processing indicated by the processing item if the user selects no processing item within a predetermined time period (i.e., a timeout of the timer 20 occurs).

The user can select in advance any one of the operation modes M1 to M3 and set it as the operation mode when the terminal 1 is mounted on the battery charger 2.

Figure 3:
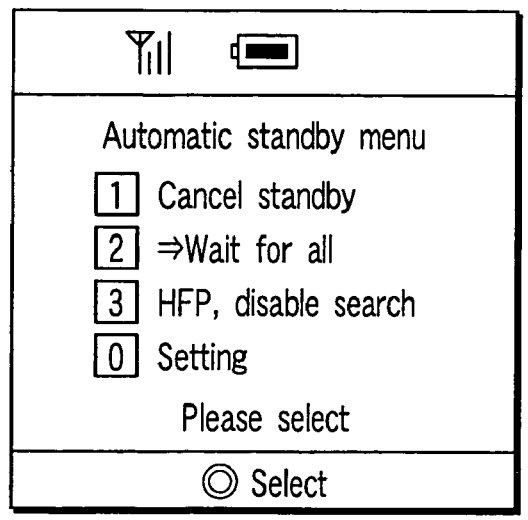
FIG. 3 is a view showing an example of a display window in the second operation mode.

FIG. 3 shows an example of a display window in the case of M2 (the second operation mode). As shown in FIG. 3, various processing items "cancel standby", "wait for all", "HFP, disable search", and "setting" are displayed as choices on the screen of the display unit 18 of the terminal 1, and a message "Please select." is displayed.

The item "cancel standby" means canceling the standby state. The item "wait for all" means receiving signals sent from an external device without limit. The item "HFP, disable search" means enabling, as a service, only the connection based on an HFP (Hands Free Profile) by another device and disabling a search for the terminal 1 (not responding to a search signal). The item "setting" is provided for the user to perform various edit operations that pertain to the processing items.

An arrow in FIG. 3 indicates the focus of selection. In the example shown in FIG. 3, the focus is located at the item "wait for all". A processing item selected by the user for the display is set, and the corresponding processing is executed.

Figure 4:
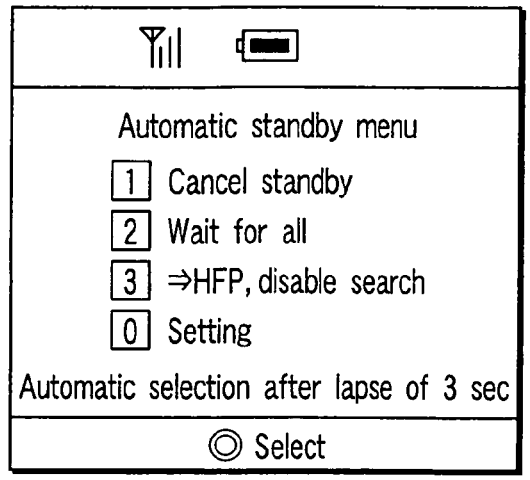
FIG. 4 is a view showing an example of a display window in the third operation mode.

FIG. 4 shows an example of a display window in the case of M3 (the third operation mode). As shown in FIG. 4, various processing items "cancel standby", "wait for all", "HFP, disable search", and "setting" are displayed as choices on the screen of the display unit 18 of the terminal 1, and a message "Automatic selection after a lapse of 3 sec." is displayed. In the example shown in FIG. 4, the focus is located at the item "HFP, disable search". If the user makes no selection for the display within, e.g., 3 sec, the processing item "HFP, disable search" is automatically selected and set, and the corresponding processing is executed.

Then, the various operation modes when the terminal 1 is removed from the battery charger 2 will be described.

As shown on the right side of FIG. 2, when the user removes the terminal 1 from the battery charger 2 during the standby operation, and the detection unit 13 detects the non-connection state and power supply stop state, operation modes to which the terminal 1 shifts include the following three types of modes:

M4 (fourth operation mode): a mode of automatically stopping the standby operation (note that the default is the automatic stop of the standby operation);

M5 (fifth operation mode): a mode of presenting a plurality of processing items as choices to the user and executing the processing indicated by the selected processing item; and M6 (sixth operation mode): a mode of presenting a plurality of processing items as choices to the user and automatically selecting a predetermined processing item and executing the processing indicated by the selected processing item if the user selects no processing item within a predetermined time period (i.e., a timeout of the timer 20 occurs).

The user can select in advance any one of the operation modes M4 to M6 and set it as the operation mode when the terminal 1 is removed from the battery charger 2.

Figure 5:
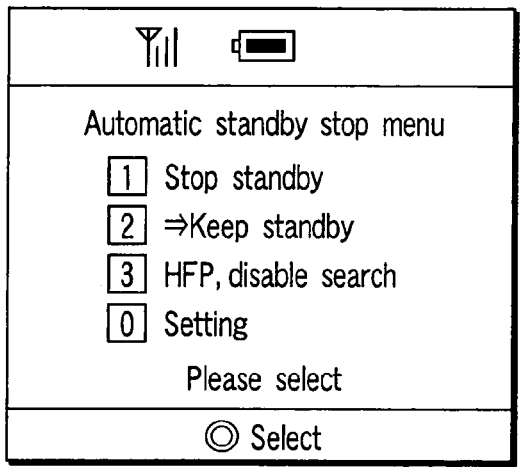
FIG. 5 is a view showing an example of a display window in the fifth operation mode.

FIG. 5 shows an example of a display window in the case of M5 (the fifth operation mode). As shown in FIG. 5, various processing items "stop standby", "keep standby", "HFP, disable search", and "setting" are displayed as choices on the screen of the display unit 18 of the terminal 1, and a message "Please select." is displayed. The processing item "stop standby" means canceling the standby state. The processing item "keep standby" means keeping the standby state. In the example shown in FIG. 5, the focus is located at the item "keep standby". A processing item selected by the user for the display is set, and the corresponding processing is executed.

Figure 6:
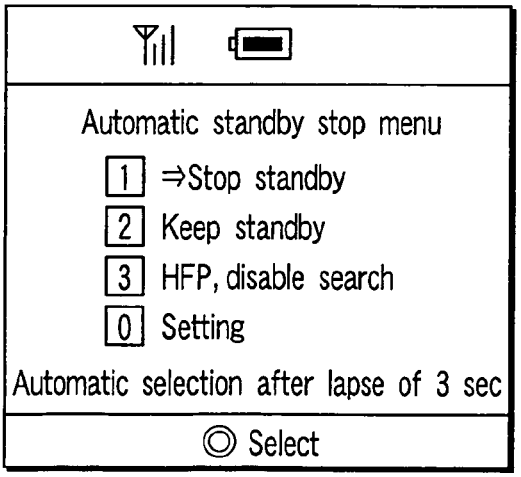
FIG. 6 is a view showing an example of a display window in the sixth operation mode.

FIG. 6 shows an example of a display window in the case of M6 (the sixth operation mode). As shown in FIG. 6, various processing items "stop standby", "keep standby", "HFP, disable search", and "setting" are displayed as choices on the screen of the display unit 18 of the terminal 1, and a message "Automatic selection after a lapse of 3 sec." is displayed. In the example shown in FIG. 6, the focus is located at the item "stop standby". If the user makes no selection for the display within, e.g., 3 sec, the processing item "stop standby" is automatically selected and set, and the corresponding processing is executed.

In addition to the item "HFP, disable search", a processing item "AVRCP, disable search" that means enabling only the connection based on an AVRCP (Audio Video Remote Control Profile) by another device and disabling a search for the terminal 1. Further, a DUN (Dial Up Network profile) may be added. Still further, a processing item "HFP and AVRCP, disable search" that means enabling only the connections based on the HFP and AVRCP by another devices and disabling a search for the terminal 1 may be added. Still further, a processing item "OPP, disable search" that means enabling only the connection based on an OPP (Object Push Profile) by another device and disabling a search for the terminal 1 may be added. Additionally, processing items "enable search", "enable connection", "execute authentication", "execute encryption", and "authorization" may appropriately be adopted as other user-selectable processing items.

Figure 7:
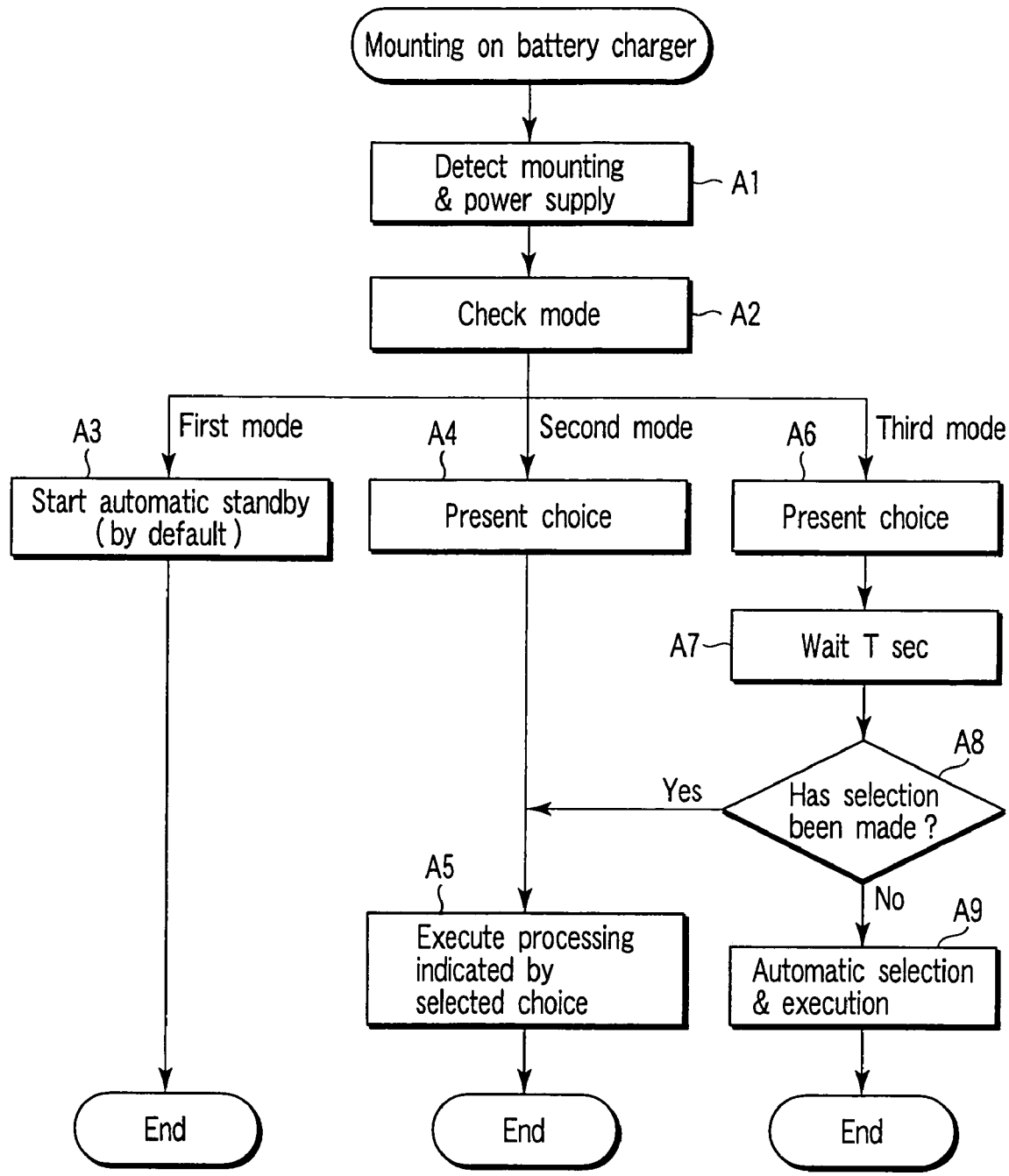
FIG. 7 is a flowchart showing the operation when the terminal is mounted on the battery charger.

The operation when the terminal 1 is mounted on the battery charger 2 will be described with reference to FIG. 7.

When the user mounts (sets) the terminal 1 of the standby stop state on the battery charger 2, the detection unit 13 detects the connection state and power supply state, and informs the controller 21 of the detection result (step A1). Upon reception of the detection result, the controller 21 refers to the setting information storage unit 19 and checks the operation mode set in advance by the user (step A2).

If the first operation mode is set, the controller 21 starts the standby operation through the wireless communication unit 16 (note that the default is the automatic start of the standby operation) (step A3).

If the second operation is set, the controller 21 presents a plurality of processing items as choices to the user through the display unit 18 (step A4) and executes the processing indicated by the processing item selected through the input unit 17 (step A5).

If the third operation is set, the controller 21 presents the plurality of processing items as the choices to the user through the display unit 18 (step A6) and waits T sec (e.g., 3 sec) (step A7). The controller 21 determines whether the user performs selection operation through the input unit 17 during the period (step A8).

If any selection operation is performed within T sec, the controller 21 executes the processing indicated by the processing item selected through the input unit 17 (step A5). On the other hand, if no selection operation is performed within T sec, the controller 21 automatically selects a predetermined processing item and executes the processing indicated by the item (step A9).

Figure 8:
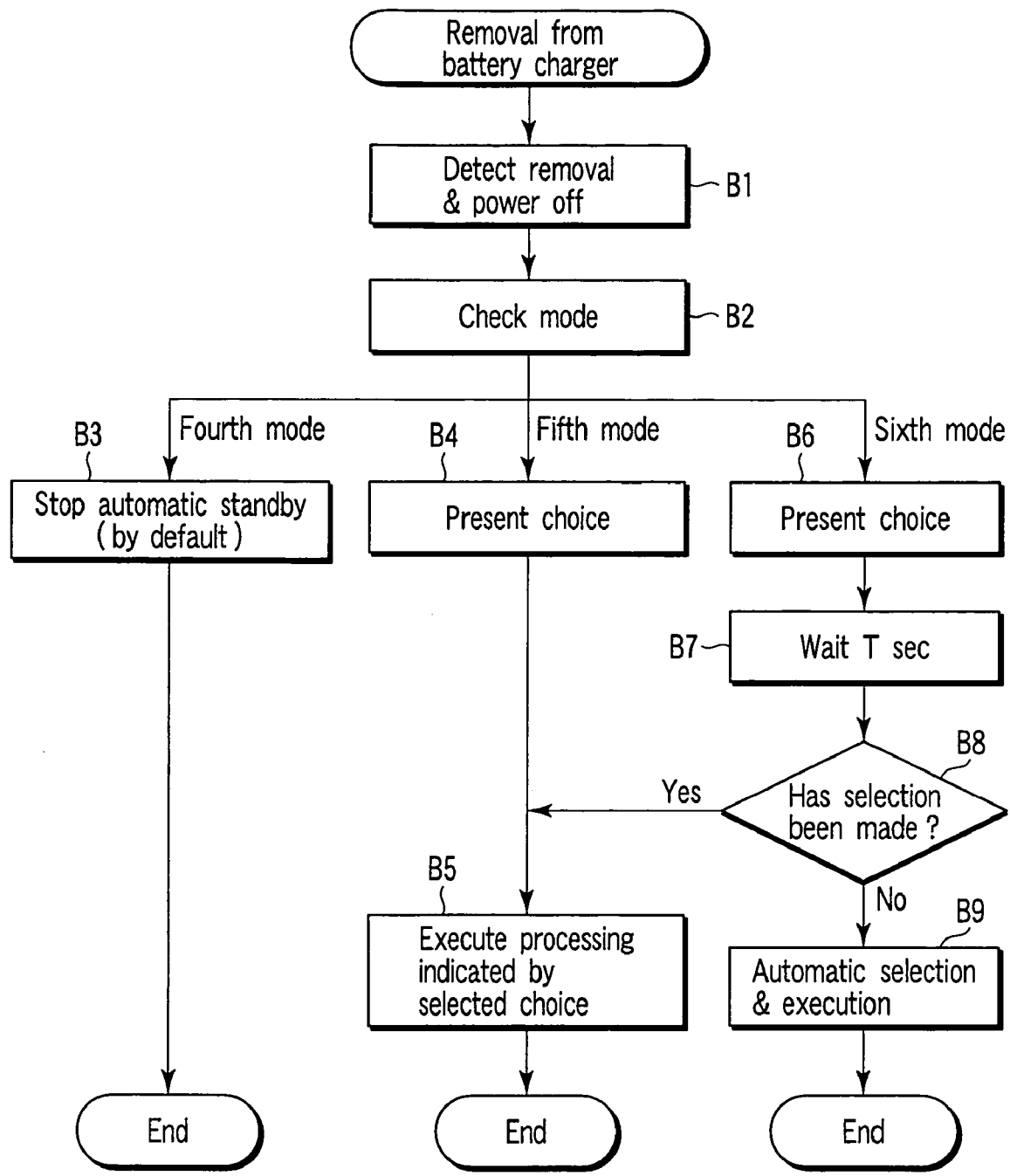
FIG. 8 is a flowchart showing the operation when the terminal is removed from the battery charger.

The operation when the terminal 1 is removed from the battery charger 2 will be described with reference to FIG. 8.

For example, when the user removes the terminal 1 from the battery charger 2 during the standby operation, the detection unit 13 detects the non-connection state and power supply stop state and informs the controller 21 of the detection result (step B1). Upon reception of the detection result, the controller 21 refers to the setting information storage unit 19 and checks the operation mode set in advance by the user (step B2).

If the fourth operation mode is set, the controller 21 automatically stops the standby operation through the wireless communication unit 16 (note that the default is the automatic stop of the standby operation) (step B3).

If the fifth operation mode is set, the controller 21 presents a plurality of processing items as choices to the user through the display unit 18 (step B4) and executes the processing indicated by the processing item selected through the input unit 17 (step B5).

If the sixth operation mode is set, the controller 21 presents the plurality of processing items as the choices to the user through the display unit 18 (step B6) and waits T sec (e.g., 3 sec) (step B7). The controller 21 determines whether the use performs selection operation through the input unit 17 during the period (step B8).

If any selection operation is performed within T sec, the controller 21 executes the processing indicated by the processing item selected through the input unit 17 (step B5). On the other hand, if no selection operation is performed within T sec, the controller 21 automatically selects a predetermined processing item and executes the processing indicated by the item (step B9).

As described above, according to this embodiment, when the user mounts on a car-mounted hands-free battery charger a terminal released from a standby state which enables reception of radio signals of, e.g., Bluetooth, he/she can switch the terminal to the standby state immediately, automatically after several sec, or with simple operation.

When the terminal is removed from the battery charger, the terminal can be released from the standby state immediately, automatically after several sec, or with simple operation.

The terminal in the standby state can receive only signals based on a necessary profile and can be protected from being searched on the basis of an unnecessary profile. This makes it possible to maintain a high level of security with ease.

In a car, appropriately combining items "HFP and AVRCP, disable search", "authorization", and the like prevents the terminal from receiving accidentally incoming unnecessary signals based on a profile (service) such as an OPP.

At home, it is possible not to immediately receive wireless connection requests from a home server but to temporarily make them wait.

As has been described in detail, according to the present invention, the convenience in standby operation of a terminal can be increased.

What is claimed is:

1. A terminal comprising:
   a wireless communication unit to perform wireless communication;
   a battery containing unit to contain a battery, which is charged by power supplied from an external power supply;
   a detection unit to detect whether power is supplied from the external power supply;
   a setting unit to set one of a plurality of operation modes that include: (i) a first mode of enabling a signal waiting operation to be executed by the wireless communication unit when power is supplied from the external power supply and disabling the signal waiting operation when power is supplied from the battery, and (ii) a second mode of executing, by the wireless communication unit, an operation selected from among a plurality of operations in response to a change of status detected by the detection unit; and
   a control unit to: (i) while the first mode is set, control the wireless communication unit to one of enable and disable the signal waiting operation in accordance with a detection result of the detection unit, and (ii) every time the change of status is detected by the detection unit while the second mode is set, perform control to prompt a selection of one of the plurality of operations and to control the wireless communication unit to execute the selected one of the plurality of operations;
   wherein the plurality of operations comprise a first operation of disabling the signal waiting operation of the wireless communication unit, a second operation of enabling the signal waiting operation of the wireless communication unit, and a third operation of disabling a response, by the wireless communication unit, to a search signal transmitted from another terminal.

2. The terminal according to claim 1, further comprising a timer to count an elapsed time from a time point at which the selection of one of the plurality of operations is prompted upon the detection of the change of status by the detection unit while the second mode is set;
   wherein the control unit controls the wireless communication unit to execute a pre-selected one of the plurality of operations when the elapsed time counted by the timer reaches a preset value without a selection of one of the plurality of operations being made.

3. A terminal comprising:
   a short-distance wireless communication unit to perform wireless communication;
   a battery containing unit to contain a battery, which is charged by power supplied from an external power supply;
   a detection unit to detect whether power is supplied from the external power supply;
   a setting unit to set one of a plurality of operation modes that include: (i) a first mode of enabling a signal waiting operation to be executed by the short-distance wireless communication unit when power is supplied from the external power supply and disabling the signal waiting operation when power is supplied from the battery, and (ii) a second mode of executing, by the short-distance wireless communication unit, an operation selected from among a plurality of operations in response to a change of status detected by the detection unit; and a control unit to: (i) while the first mode is set, control the short-distance wireless communication unit to one of enable and disable the signal waiting operation in accordance with a detection result of the detection unit, and (ii) every time the change of status is detected by the detection unit while the second mode is set, perform control to prompt a selection of one of the plurality of operations and to control the short-distance wireless communication unit to execute the selected one of the plurality of operations;

wherein the plurality of operations comprise a first operation of disabling the signal waiting operation of the short-distance wireless communication unit, a second operation of enabling the signal waiting operation of the short-distance wireless communication unit, and a third operation of disabling a response, by the short-distance wireless communication unit, to a search signal transmitted from another terminal.

4. The terminal according to claim 3, further comprising a timer to count an elapsed time from a time point at which the selection of one of the plurality of operations is prompted upon the detection of the change of status by the detection unit while the second mode is set;

wherein the control unit controls the short-distance wireless communication unit to execute a pre-selected one of the plurality of operations when the elapsed time counted by the timer reaches a preset value without a selection of one of the plurality of operations being made.

5. A terminal comprising:
a short-distance wireless communication unit to perform wireless communication;
a battery, which is charged by power supplied from an external power supply;
a detection unit to detect whether power is supplied from the external power supply;

a setting unit to set one of a plurality of operation modes that include: (i) a first mode of enabling a signal waiting operation to be executed by the short-distance wireless communication unit when power is supplied from the external power supply and disabling the signal waiting operation when power is supplied by the battery, and (ii) a second mode of executing, by the short-distance wireless communication unit, an operation selected from among a plurality of operations in response to a change of status detected by the detection unit; and a control unit to: (i) while the first mode is set, control the short-distance wireless communication unit to one of enable and disable the signal waiting operation in accordance with a detection result of the detection unit, and (ii) every time the change of status is detected by the detection unit while the second mode is set, perform control to prompt a selection of one of the plurality of operations and to control the short-distance wireless communication unit to execute the selected one of the plurality of operations;

wherein the plurality of operations comprise a first operation of disabling the signal waiting operation of the short-distance wireless communication unit, a second operation of enabling the signal waiting operation of the short-distance wireless communication unit, and a third operation of disabling a response, by the short-distance wireless communication unit, to a search signal transmitted from another terminal.

6. The terminal according to claim 5, further comprising a timer to count an elapsed time from a time point at which the selection of one of the plurality of operations is prompted upon the detection of the change of status by the detection unit while the second mode is set;

wherein the control unit controls the short-distance wireless communication unit to execute a pre-selected one of the plurality of operations when the elapsed time counted by the timer reaches a preset value without a selection of one of the plurality of operations being made.

* * * * *